(12) United States Patent
Dumant et al.

(10) Patent No.: US 10,997,504 B2
(45) Date of Patent: May 4, 2021

(54) KNOWLEDGE-DRIVEN GENERATION OF SEMANTIC LAYER

(71) Applicant: Business Objects Software Limited, Dublin (IE)

(72) Inventors: Bruno Dumant, Verneuil sur Seine (FR); Xiaohui Xue, Courbevoie (FR); Pierre Saurel, Colombes (FR)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 280 days.

(21) Appl. No.: 15/342,544

(22) Filed: Nov. 3, 2016

(65) Prior Publication Data

US 2018/0121424 A1 May 3, 2018

(51) Int. Cl.
*G06N 5/02* (2006.01)
*G06F 16/22* (2019.01)

(52) U.S. Cl.
CPC ............ *G06N 5/022* (2013.01); *G06F 16/22* (2019.01)

(58) Field of Classification Search
CPC ... G06N 5/022; G06F 17/30312; G06F 16/22; G06F 16/164; G06F 16/211
See application file for complete search history.

(56) References Cited

U.S. PATENT DOCUMENTS

| | | | | |
|---|---|---|---|---|
| 2003/0093770 | A1* | 5/2003 | Fernandez | G06F 9/4493 717/118 |
| 2006/0242624 | A1* | 10/2006 | Mueller-Klingspor | G06F 17/30731 717/114 |
| 2013/0117291 | A1* | 5/2013 | Roy-Faderman | G06F 8/24 707/756 |
| 2013/0166547 | A1* | 6/2013 | Pasumarthi | G06Q 10/06 707/728 |
| 2014/0351296 | A1* | 11/2014 | Hays | G06F 17/211 707/812 |
| 2015/0363711 | A1* | 12/2015 | Raman | G06Q 10/063 705/7.11 |
| 2016/0170999 | A1* | 6/2016 | Cuddihy | G06F 17/3056 707/722 |
| 2016/0335544 | A1* | 11/2016 | Bretschneider | G06N 5/022 |
| 2017/0041419 | A1* | 2/2017 | Zhong | G06F 3/067 |
| 2017/0139995 | A1* | 5/2017 | Mielenhausen | G06F 17/30292 |

OTHER PUBLICATIONS

LeBiannic, Yann, U.S. Appl. No. 15/189,220, entitled "Identification of Common Attributes in Multiple Datasets", filed Jun. 22, 2016.

* cited by examiner

*Primary Examiner* — James Trujillo
*Assistant Examiner* — J Mitchell Curran
(74) *Attorney, Agent, or Firm* — Buckley, Maschoff & Talwalkar LLC (57) ABSTRACT

A system includes acquisition of data from a first data source, identification of logical entities of a first data model of the first data source based on the data of the first data source, identification, for one or more of the logical entities of the first data model, of a respective knowledge vault entity described by first metadata, and generation of second metadata describing a plurality of semantic layer entities, the second metadata describing a semantic layer entity comprising at least one semantic attribute of a knowledge vault entity corresponding to the semantic layer entity.

19 Claims, 11 Drawing Sheets

KNOWLEDGE-DRIVEN GENERATION OF SEMANTIC LAYER

BACKGROUND

Enterprise computing systems receive, generate, and store data related to many aspects of an enterprise. Users operate reporting tools to access such data and display the data in useful formats, such as in graphic visualizations.

Reporting tools allow a user to define queries and visualizations based on a set of objects, known as a semantic layer. Each object of a semantic layer associates one or more physical entities (e.g., a physical database table, associated columns of one or more database tables, etc.) of one or more data sources with attributes having user-friendly names. These attributes may include dimensions, along which one may want to perform an analysis or report (e.g., Year, Country, Product), or measures (e.g., Sales, Profit), whose values can be aggregated from a given combination of dimension values.

A semantic layer is generated by determining objects and attributes based on the physical entities of a given data source. This determination may be resource-intensive and require significant human intervention. Moreover, the generated semantic layer may inadequately describe characteristics and dependencies of the attributes.

DETAILED DESCRIPTION

The following description is provided to enable any person in the art to make and use the described embodiments. Various modifications, however, will remain readily apparent to those in the art.

Generally, some embodiments provide efficient generation of a semantic layer based on a data source. Generation of the semantic layer may be facilitated by a "knowledge vault" providing dependencies and other semantic information of entities identified in the data source. According to some embodiments, a generated semantic layer may be modified by a user. The modifications may be incorporated into the knowledge vault and subsequently used in the generation of another semantic layer based on another data source.

Figure 1:
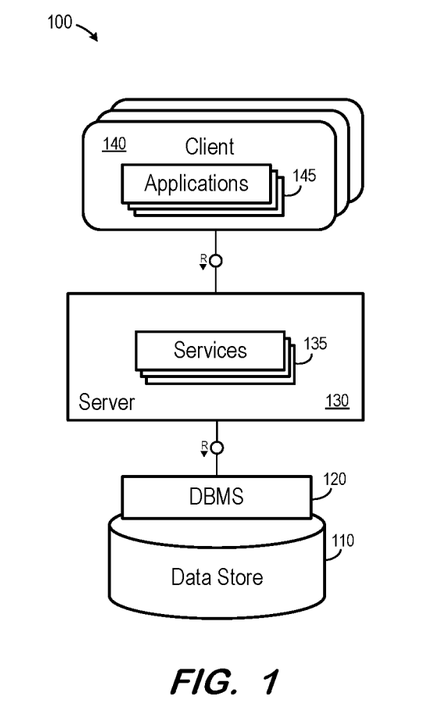
FIG. 1 is a block diagram of a system architecture according to some embodiments.

FIG. 1 is a block diagram of architecture 100 according to some embodiments. Embodiments are not limited to architecture 100 or to a database architecture.

Architecture 100 includes data store 110, database management system (DBMS) 120, server 130, services 135, clients 140 and applications 145. Generally, services 135 executing within server 130 receive requests from applications 145 executing on clients 140 and provides results to applications 145 based on data stored within data store 110.

More specifically, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145, retrieving data from data store 110 based on the requests, processing the data received from data store 110, and providing the processed data to applications 145. Services 135 may be made available for execution by server 130 via registration and/or other procedures which are known in the art.

In one specific example, a client 140 executes an application 145 to present a user interface to a user on a display of the client 140. The user enters a query into the user interface consisting of one or more dimensions and/or one or more measures. The query may also include other information such as filters. The application 145 passes a request based on the query to one of services 135. An SQL script is generated based on the request and forwarded to DBMS 120. DBMS 120 executes the SQL script to return a result set based on data of data store 110, and the application 145 creates a report/visualization based on the result set.

Server 130 provides any suitable protocol interfaces through which applications 145 executing on clients 140 may communicate with services 135 executing on application server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any clients 140 which implement the WebSocket protocol over a single TCP connection.

One or more services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Server 130 may be separated from or closely integrated with DBMS 120. A closely-integrated server 130 may enable execution of services 135 completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Server 130 may provide application services (e.g., via functional libraries) using which services 135 may manage and query the data of data store 110. The application services can be used to expose the database data model, with its tables, views and database procedures, to clients. In addition to exposing the data model, server 130 may host system services such as a search service.

Each of clients 140 may comprise one or more devices executing program code of an application 145 for presenting user interfaces to allow interaction with application server 130. The user interfaces of applications 145 may comprise user interfaces suited for reporting, data analysis, and/or any other functions based on the data of data store 110.

Data store 110 may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, graph-based data and object-based data. The data may be relational, but is not necessarily so. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Figure 2:
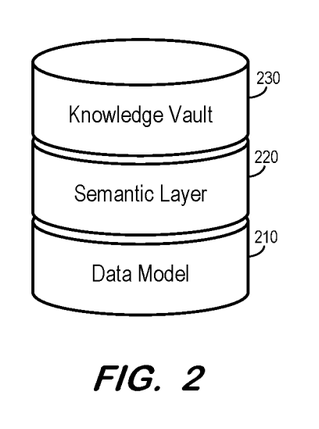
FIG. 2 is a representation of data concepts according to some embodiments.

FIG. 2 represents a hierarchy of metadata according to some embodiments. Data model 210 defines the physical (e.g., tabular) structure of datasets of a data source. For example, data model 210 may describe the columns of the database tables storing data within data store 110. Data model 210 may include database statistics (e.g., column cardinality, etc.) computed based on the data stored within the database tables. Moreover, data model 210 may describe indexes and keys. Data model 210 may be generated from a data source at crawl-time or upon upload of a data source (e.g., a comma-separated value file).

Semantic layer 220 may comprise a semantic layer as described above. Semantic layer 220 is a representation of data model 210, and is intended to support queries received from clients 140. Semantic layer 220 may be stored within the metadata of data store 110, but embodiments are not limited thereto.

Semantic layer 220 may comprise a normalized entity-relationship model, where the entities are linked through functional dependencies. Semantic layer 220 may expose objects determined based on entities of data model 210, or from other elements of semantic layer 220.

Knowledge vault 230 comprises one or more abstract models. These models may act as "templates" or "types" of models within semantic layer 220. The abstract models may exist independently of any dataset. An abstract model may be packaged as, for example, (1) a set of nodes and associations representing concepts and their relationships, (2) synonyms, (3) sample data to facilitate the association of physical attributes to meta-attributes, and (4) other semantic information such as, but not limited to, unit, semi-additivity, etc.

Models of knowledge vault 230 may be expressed using abstractions of a current model: Entities and Entity Sets, Attributes (e.g., measures, dimensions and details), functional Dependencies, aggregation models, semantic relations between entities, hierarchies, formulas, etc. Models of knowledge vault 230 may be enriched with information specifying a generalization (e.g., meta-entity A generalizes meta-entity B) or a singleton (e.g., meta-entity A should be instantiated only once in a semantic layer). Knowledge vault 230 may specify units (e.g., currencies), which may be referenced from semantic layer 220.

Figure 3:
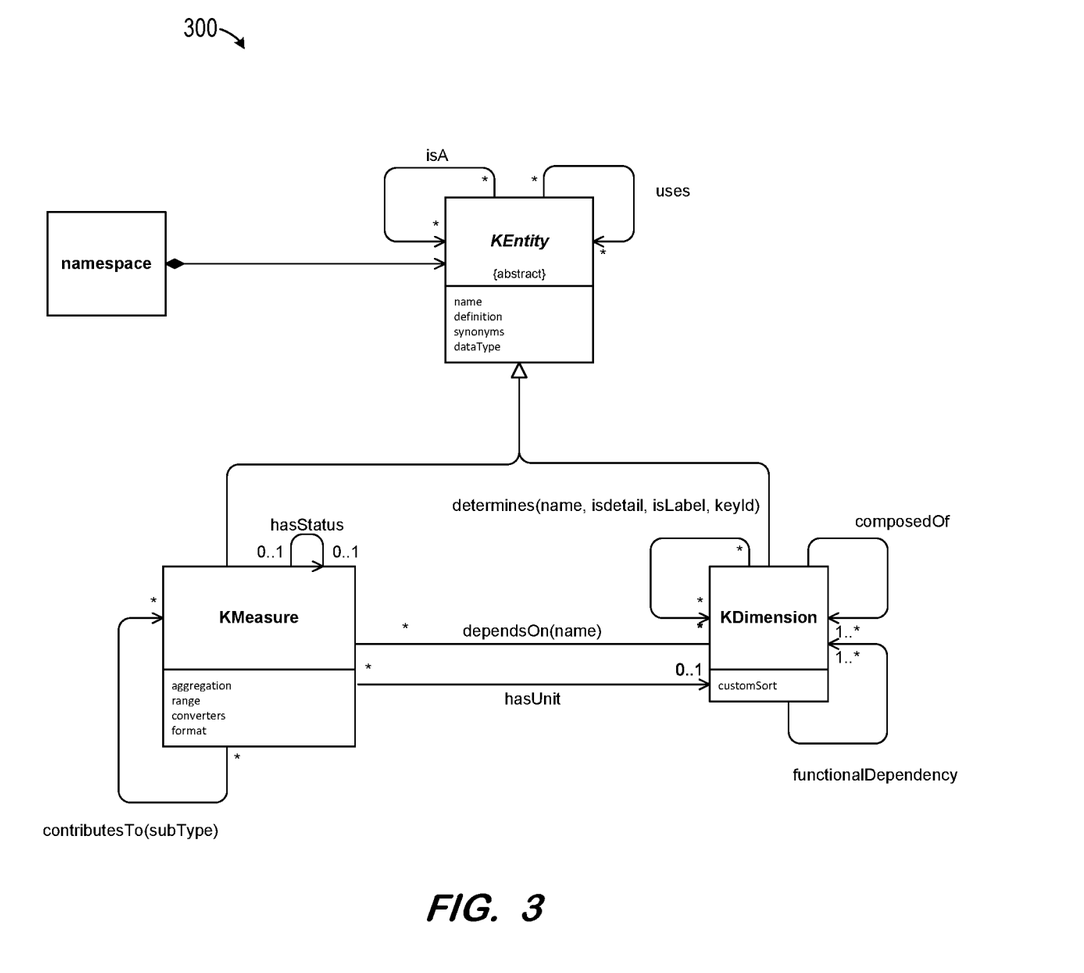
FIG. 3 is a modelling diagram of a knowledge vault according to some embodiments.

FIG. 3 illustrates model diagram 300 of knowledge vault 230 according to some embodiments. Diagram 300 models a set of nodes and associations representing enterprise concepts and their relationships. These relationships may include enterprise names and synonyms, data types, data values, and sample values, dimensionality and aggregation specificities of measures, semantic associations between concepts, calculated measures, calculated formulas, etc.

Figure 4:
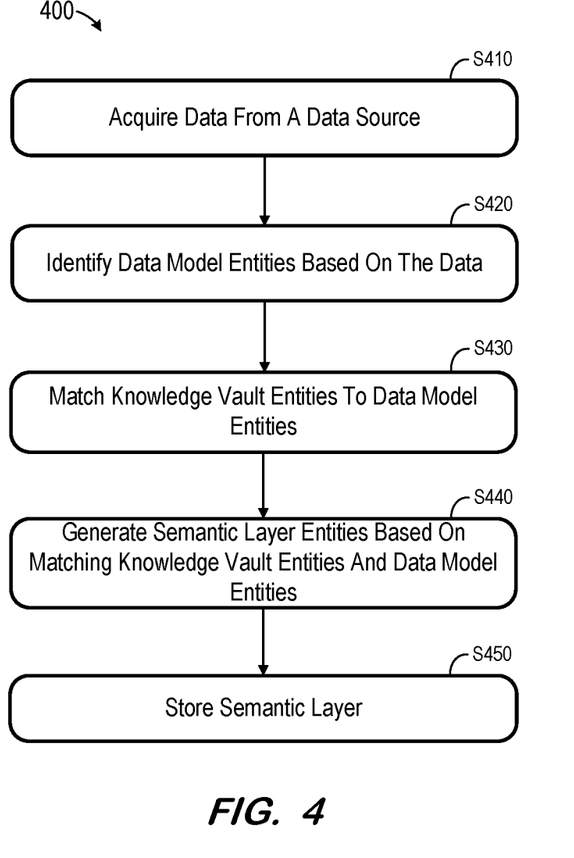
FIG. 4 comprises a flow diagram of a process according to some embodiments.

FIG. 4 comprises a flow diagram of process 400 to generate a semantic layer using a knowledge vault according to some embodiments. Process 400 may be executed upon import of a new data source and/or periodic crawling of a data source. In some embodiments, various hardware elements of system 100 execute program code to perform process 400. Process 400 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S410, data is acquired from a data source. The data source may comprise any data source that is or becomes known, including but not limited to a relational database or a spreadsheet of comma-separated values. The data may be acquired as part of a process to import data into data store 110.

Next, at S420, entities (i.e., attributes) of a data model are identified based on the data. Such identification may include distinguishing measures from attributes within the acquired data. Also determined from the data at S420 may be parameters, crawled associations (i.e., foreign keys), domains, and statistics. Data model entities may be determined from the acquired data using any technique that is or becomes known. According to some embodiments, a data model is determined at S420 using systems described in commonly-assigned, co-pending U.S. patent application Ser. No. 15/189,220.

The data model entities are matched to entities (i.e., concepts) of a knowledge vault at S430. The matching may include matching names of data model entities (e.g., using synonyms and/or fuzzy matching) to names of knowledge vault entities. Matching may also be based on functional dependencies between entities, and on entity hierarchies. Matching of measure entities at S430 may also be based on measure dimensionality.

Semantic layer entities are generated at S440 based on the matching knowledge vault entities and data model entities. Such generation may include the generation of dimensions as clusters of attributes based, for example, on the detection of keys with the data model and/or key information stored within the knowledge vault. Generation of the semantic layer entities may also be based on the detection of functional dependencies within the data model. Moreover, hierarchies detected in the data model may be matched with hierarchies of the knowledge vault in order to generate the semantic layer entities.

S440 may also comprise the association of semantic information and measure properties with semantic layer entities. For example, a knowledge vault entity may be associated with semantic information and/or measure properties (e.g., units, currency, aggregations), and these details are therefore associated with a corresponding semantic layer entity during S440.

The generated semantic layer is stored at S450. The generated semantic layer may be stored as metadata of system 100 to facilitate querying and management of the data acquired at S410 and stored in data store 110.

Figure 5:
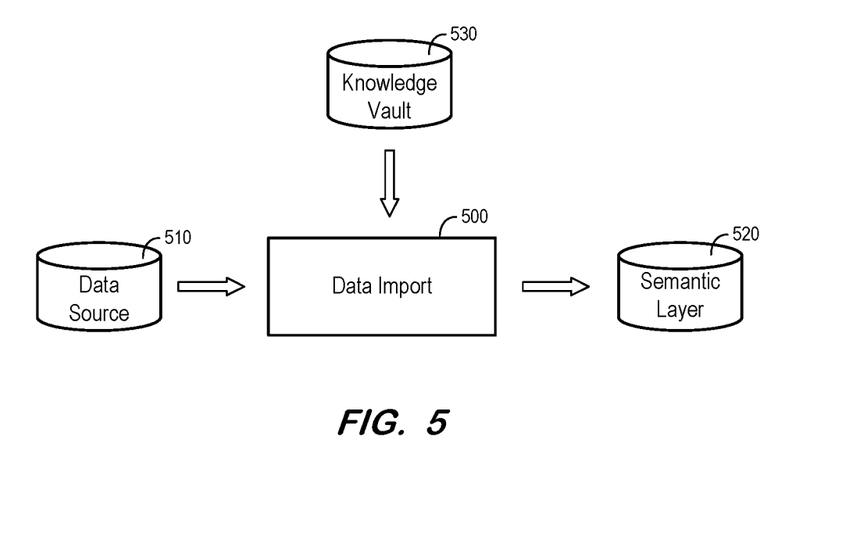
FIG. 5 illustrates generation of a semantic layer according to some embodiments.

FIG. 5 illustrates process 400 according to some embodiments. Data import processor 500 may comprise processor-executable code to acquire data from data source 510 at S410. Data import processor 500 may then, at S420, identify data model entities based on the acquired data.

Next, at S430, the data model entities are matched to entities of knowledge vault 530. Flow then proceeds to S440 to generate semantic layer 520 based on the matching entities. Entities of semantic layer 520 may be associated with semantics of a matching knowledge vault entity. As described above, semantic layer 520 may be stored as metadata within data store 110 of system 100, thereby facilitating the query and management of the data of data source 510.

Figure 6:
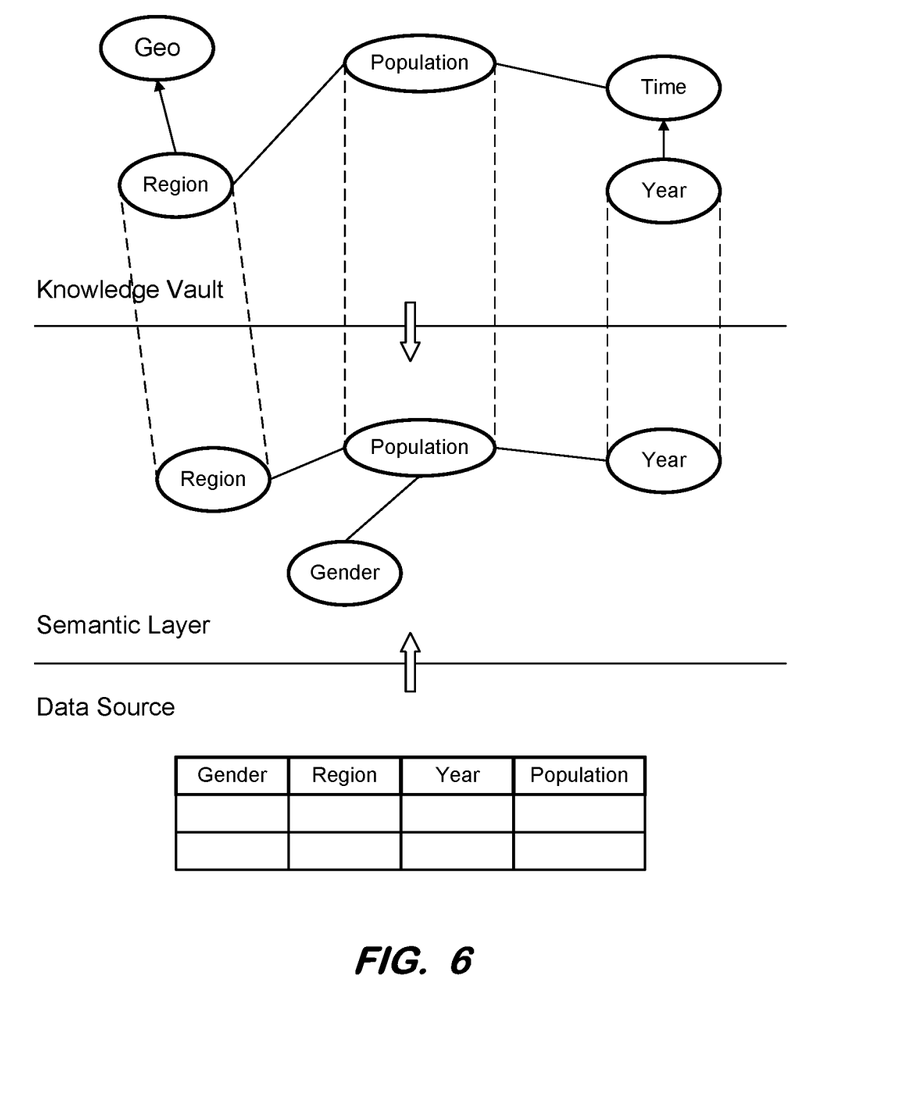
FIG. 6 illustrates generation of a semantic layer based on a data model and a knowledge vault according to some embodiments.

FIG. 6 illustrates process 400 according to some embodiments. The data source to import is represented as a table, with each column representing an entity (i.e., Region, Gender, Population, Year) of a corresponding data model. It is determined (e.g., at S430), that the data model entities Region, Population, and Year match knowledge vault entities Region, Population, and Year. This determination may be based on name matching (e.g., based on fuzzy matching algorithms and/or synonyms stored in the knowledge vault), an analysis of the data within corresponding columns of the data source, an analysis of entity dependencies, and/or by any other system that is or becomes known. Respective semantic layer entities Region, Population, and Year are then generated and the semantics of the matching knowledge vault entities Region, Population, and Year and assigned to their corresponding semantic layer entities.

Figure 7:
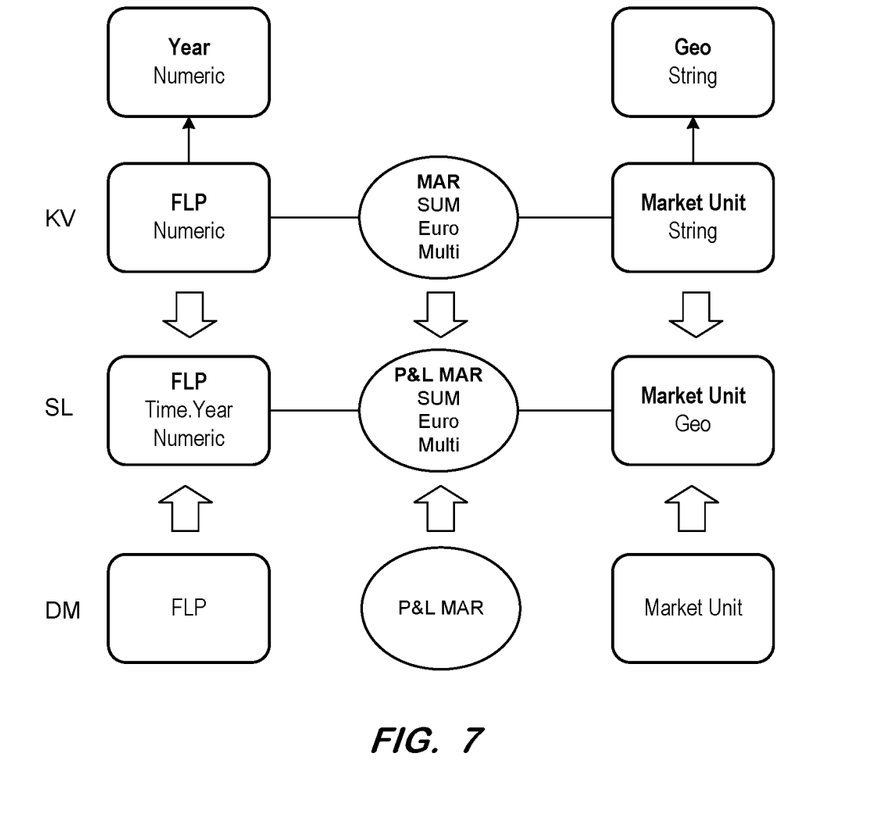
FIG. 7 illustrates generation of a semantic layer based on a data model and a knowledge vault according to some embodiments.

FIG. 7 illustrates another example of process 400 to generate a semantic layer according to some embodiments. As illustrated, data model DM of a data source is determined to include entities Financial Period (FLP), Revenue (P&L MAR) and Market Unit. Entities FLP, P&L MAR and Market Unit of knowledge vault KV are then identified as matching the three entities of data model DM.

The entities of semantic layer SL are then generated, with the semantics of matching entities of knowledge vault KV being assigned to the corresponding entities of semantic layer SL. For example, the entity FLP of knowledge vault KV exhibits an "isA" relation to the entity "Year". As such, FLP is a Year attribute with specific semantics (i.e., "financial year"), and it is also known that it exhibits a numeric value. The entity MAR of knowledge vault KV is a measure of which the default aggregation is SUM, and its default unit is Euro. These semantics are thereby assigned to corresponding entity P&L MAR of semantic layer SL. Moreover, the entity Market Unit of knowledge vault KV exhibits an "isA" relation to the entity "Geo", so entity Market Unit of semantic layer SL is defined as a Geo entity.

Generation of semantic layer SL based on data model DM and the semantics of knowledge vault KV allows these semantics to be used to determine an appropriate visualization. For example, if a query including the semantic layer entity Market Unit is received, it may be determined to visualize the result set as a geomap.

Figure 8:
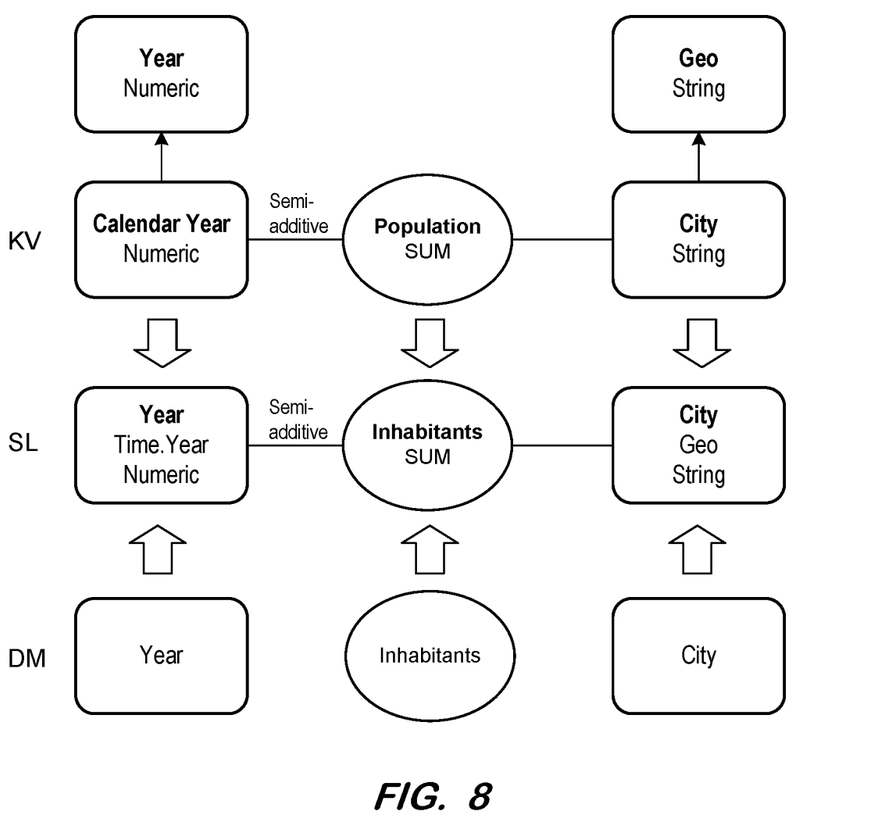
FIG. 8 illustrates generation of a semantic layer based on a data model and a knowledge vault according to some embodiments.

FIG. 8 illustrates an example of process 400 to enrich a semantic layer according to some embodiments. Data model DM of a data source is determined to include entities Year, Inhabitants and City. These entities are determined to match, respectively, entities Calendar Year, Population and City of knowledge vault KV. Next, entities Year, Inhabitants and City of semantic layer SL are generated.

Entity Population of knowledge vault KV is linked to knowledge vault KV entities Calendar Year and City. Accordingly, these linkages are reflected in corresponding entities of semantic layer SL Year, Inhabitants and City. Moreover, the link between knowledge vault KV entities Population and Calendar Year is semi-additive, meaning that values of Population should not be aggregated over two or more years. This aggregation is similarly associated with the link between corresponding entities of semantic layer SL Year and Inhabitants.

Additionally, since entity Calendar Year of knowledge vault KV is a time value, corresponding entity Year of semantic layer SL is designated as a time value. Similarly, entity City of knowledge vault KV is a geography attribute, and therefore corresponding entity City of semantic layer SL is generated as a geography attribute.

Figure 9:
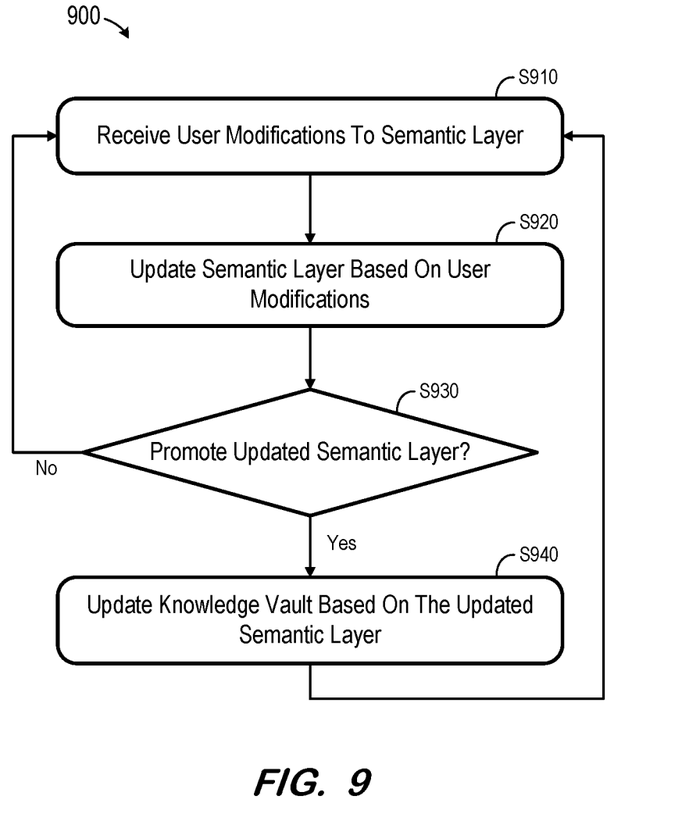
FIG. 9 comprises a flow diagram of a process according to some embodiments.

Process 900 of FIG. 9 may be executed to promote entities of a semantic layer to a knowledge vault according to some embodiments. As will be described below, such promoted entities may be used to enrich a subsequently-generated semantic layer.

User modifications to a semantic layer are received at S910. For example, an application executing on a client device may provide a user interface which may be manipulated by a user to modify a semantic layer. The modification may comprise, but is not limited to, definition of new entities, modification of entity attributes, modification of relations between entities, etc. The modification may be received by server 130 or any other system which manages metadata defining the semantic layer.

Figure 10:
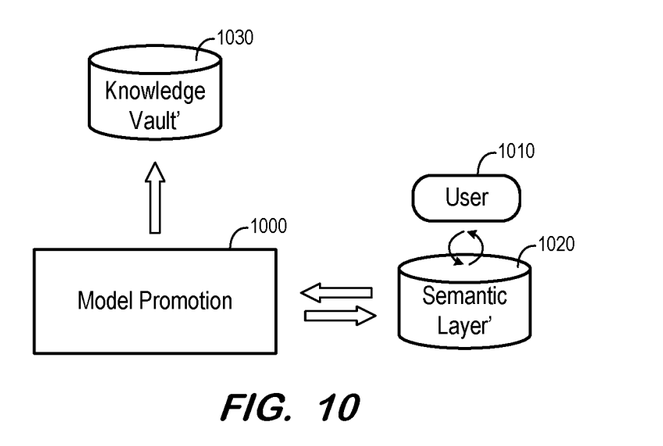
FIG. 10 illustrates modification of a semantic layer and update of a knowledge vault according to some embodiments.

Next, at S920, the semantic layer is updated based on the user modifications. The update may include modifying the metadata defining the semantic layer to reflect the modifications. FIG. 10 illustrates the modification of a semantic layer based on modifications received by user 1010, resulting in semantic layer' 1020.

It is then determined at S930 whether to promote the updated semantic layer. For example, a user may input a command to model promotion application 1000 instructing promotion of the updated semantic layer. Model promotion application 1000 may comprise a service 135 of server 130 according to some embodiments. If no such command (or other trigger) is received, flow returns to S910 to await any other modifications from the user. Flow proceeds from S930 to S940 if it is determined to promote the updated semantic layer.

According to some embodiments, promotion of a semantic layer is not an option. For example, flow simply cycles between S910 and S920 to allow a user to modify a semantic layer.

If it is determined to promote the updated semantic layer, the knowledge vault is updated at S940 based on the updated semantic layer. The knowledge vault being updated may be the same knowledge vault which was used to originally generate the subsequently-updated semantic layer. Updating the semantic layer may include modifying the metadata defining the knowledge vault to reflect the updated semantic layer. As also illustrated in FIG. 10, model promotion application 1000 may update the knowledge vault to generate knowledge vault' 1030 according to some embodiments. Flow then returns to S910 to await any other modifications from the user.

Figure 11:
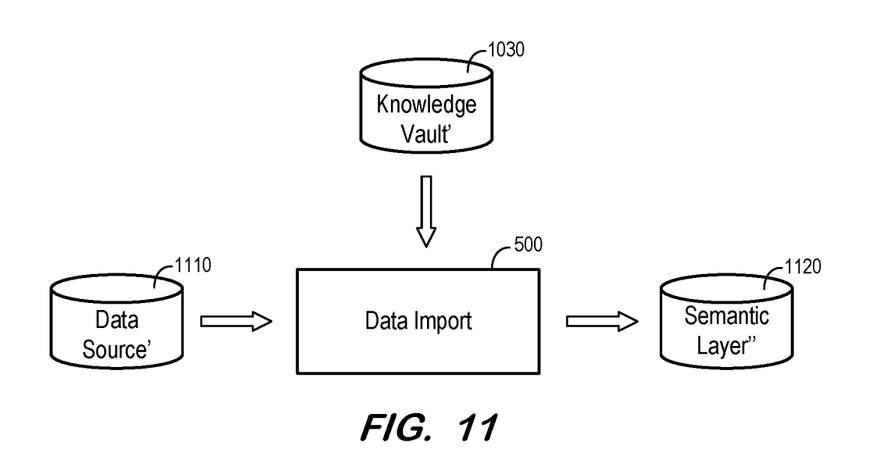
FIG. 11 illustrates generation of a semantic layer based on an updated knowledge vault according to some embodiments.

The updated knowledge vault may be used as described with respect to process 400 to generate a new semantic layer. As shown in FIG. 11, data import processor 500 may acquire data from data source' 1110 and generate semantic layer" 1120 based on the data of data source and the entities and information of updated knowledge vault' 1030. semantic layer" 1120 may be stored as metadata within data store 110 of system 100, thereby facilitating the query and management of the data of data source' 1110.

Figure 12:
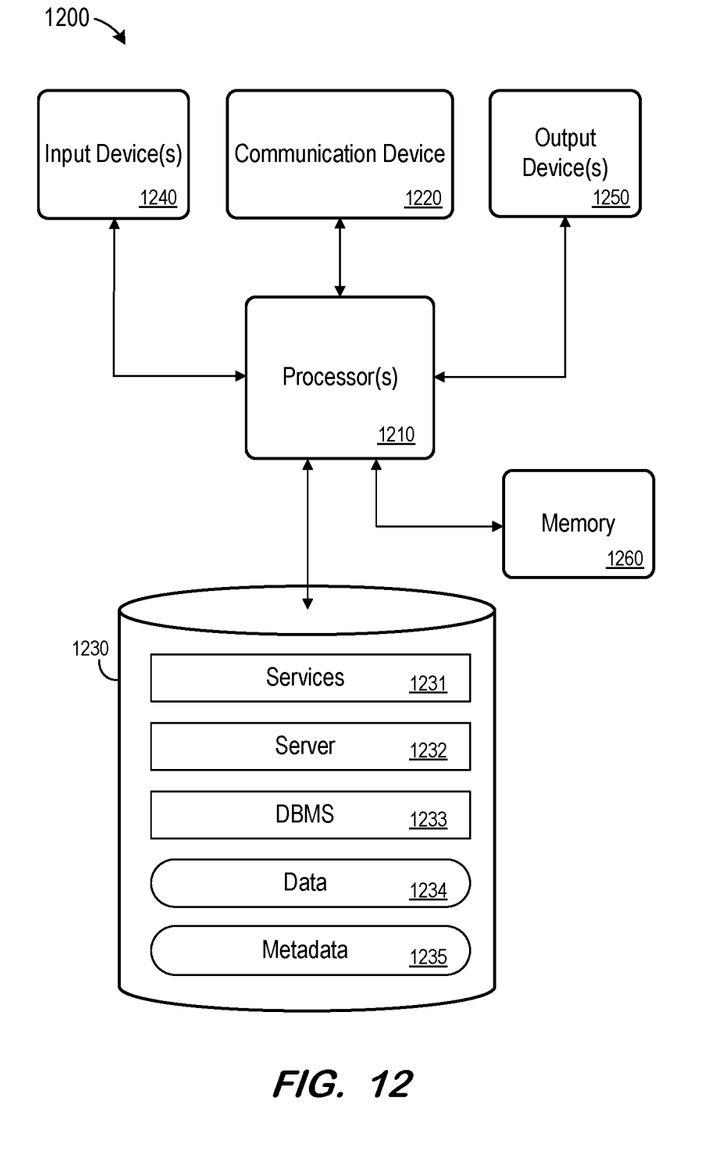
FIG. 12 is a block diagram of an apparatus according to some embodiments.

FIG. 12 is a block diagram of apparatus 1200 according to some embodiments. Apparatus 1200 may comprise a general-purpose computing apparatus and may execute program code to perform any of the functions described herein. Apparatus 1200 may comprise an implementation of server 130, DBMS 120 and data store 110 of FIG. 1 in some embodiments. Apparatus 1200 may include other unshown elements according to some embodiments.

Apparatus 1200 includes processor 1210 operatively coupled to communication device 1220, data storage device 1230, one or more input devices 1240, one or more output devices 1250 and memory 1260. Communication device 1220 may facilitate communication with external devices, such as a reporting client, or a data storage device. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into apparatus 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 1260 may comprise Random Access Memory (RAM), Storage Class Memory (SCM) or any other fast-access memory.

Services 1231, server 1232 and DBMS 1233 may comprise program code executed by processor 1210 to cause apparatus 1200 to perform any one or more of the processes described herein. Embodiments are not limited to execution of these processes by a single apparatus.

Data 1234 and metadata 1235 (either cached or a full database) may be stored in volatile memory such as memory 1260. Metadata 1235 may include data defining one or more semantic layers and knowledge vaults as described herein. Data storage device 1230 may also store data and other program code for providing additional functionality and/or which are necessary for operation of apparatus 1200, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a first data source;
   a knowledge vault comprising one or more knowledge vault models, wherein the knowledge vault models exist independently of any dataset;
   a data server to:
      acquire data from the first data source;
      identify logical entities of a first data model of the first data source based on the data of the first data source, wherein the first data model defines a physical structure of datasets of the first data source, and the knowledge vault model of the knowledge vault provides dependencies and semantic information for the logical entities of the first data model;
      match, for one or more of the logical entities of the first data model, a respective knowledge vault entity described by first metadata, wherein the knowledge vault entity is a concept represented by the knowledge vault model, and wherein the matching includes matching at least one of: the name of the logical entity of the first data model to the name of the knowledge vault entity, functional dependencies between the logical entity of the first data model and the knowledge vault entity, hierarchies of the logical entity of the first data model and the knowledge vault entity, and measure dimensionality of the logical entity of the first data model and the knowledge vault entity;

generate, in response to the matching, a plurality of semantic layer entities based on the matched knowledge vault entities and the one or more logical entities of the first data model, wherein the semantic layer entities provide responses to queries, and wherein generation of the semantic layer entities includes the generation of one or more dimensions as clusters of attributes, and each dimension is an element of an attribute along which an analysis may be performed;

assign semantic information of the knowledge vault entities to their corresponding semantic layer entities, wherein semantic information describes at least one semantic attribute of the knowledge vault entity assigned to the corresponding semantic layer entity; and a data store to store the semantic layer entities as second metadata describing the semantic layer entity comprising one or more dependencies and the assigned semantic information.

2. A system according to claim 1, the data server to:
modify the second metadata to modify a description of at least one of the plurality of semantic layer entities;
modify the first metadata based on the modified second metadata;
acquire data from a second data source;
identify logical entities of a second data model of the second data source based on the data of the second data source;
identify, for one or more of the logical entities of the second data model, a respective knowledge vault entity described by the modified first metadata; and
generate third metadata describing a second plurality of semantic layer entities, the third metadata describing one of the second plurality of semantic layer entities comprising at least one semantic attribute of a knowledge vault entity described by the modified first metadata and corresponding to the one of the second plurality of semantic layer entities.

3. A system according to claim 2, further comprising:
the second data source; and
a client device to issue an instruction to modify the second metadata, and to issue an instruction to modify the first metadata based on the modified second metadata.

4. A system according to claim 1, wherein the at least one semantic attribute of a respective knowledge vault entity comprises at least one of:
a relationship between the respective knowledge vault entity and another knowledge vault entity;
an attribute type; and
an aggregation type.

5. A system according to claim 1, wherein the at least one semantic attribute of a respective knowledge vault entity comprises at least one of:
an isA relationship between the respective knowledge vault entity and another knowledge vault entity.

6. A system according to claim 1, wherein matching the respective knowledge vault entity with one of the logical entities of the first data model comprises:
determination that a name of the one of the logical entities of the first data model is a synonym of a name of the respective knowledge vault entity.

7. A computer-implemented method comprising:
providing a knowledge vault comprising one or more knowledge vault models, wherein the knowledge vault models exist independently of any dataset;
acquiring data from a first data source;
identifying logical entities of a first data model of the first data source based on the data of the first data source, wherein the first data model defines a physical structure of datasets of the first data source, and the knowledge vault model of the knowledge vault provides dependencies and semantic information for the logical entities of the first data model;
matching, for one or more of the logical entities of the first data model, a respective knowledge vault entity described by first metadata, wherein the knowledge vault entity is a concept represented by the knowledge vault model, and wherein the matching includes matching at least one of: the name of the logical entity of the first data model to the name of the knowledge vault entity, functional dependencies between the logical entity of the first data model and the knowledge entity, hierarchies of the logical entity of the first data model and the knowledge vault entity, and measure dimensionality of the logical entity of the first data model and the knowledge vault entity;
generating, in response to the matching, a plurality of semantic layer entities based on the matched knowledge vault entities and the one or more logical entities of the first data model, wherein the semantic layer entities provide responses to queries, and wherein generating the semantic layer entities includes generating one or more dimensions as clusters of attributes, wherein each dimension is an element of an attribute along which an analysis may be performed;
assigning semantic information of the knowledge vault entities to their corresponding semantic layer entities, wherein semantic information describes at least one semantic attribute of the knowledge vault entity assigned to the corresponding semantic layer entity; and
storing the semantic layer entities as second metadata describing the semantic layer entity comprising one or more dependencies and the assigned semantic information.

8. A method according to claim 7, further comprising:
modifying the second metadata to modify a definition of at least one of the plurality of semantic layer entities;
modifying the first metadata based on the modified second metadata;
acquiring data from a second data source;
identifying logical entities of a second data model of the second data source based on the data of the second data source;
identifying, for one or more of the logical entities of the second data model, a respective knowledge vault entity described by the modified first metadata; and
generating third metadata describing a second plurality of semantic layer entities, the third metadata describing one of the second plurality of semantic layer entities comprising at least one semantic attribute of a knowledge vault entity described by the modified first metadata and corresponding to the one of the second plurality of semantic layer entities.

9. A method according to claim 8, further comprising:
receiving an instruction to modify the first metadata based on the modified second metadata.

10. A method according to claim 7, wherein the at least one semantic attribute of a respective knowledge vault entity comprises at least one of:
 a relationship between the respective knowledge vault entity and another knowledge vault entity;
 an attribute type; and
 an aggregation type.

11. A method according to claim 7, wherein the at least one semantic attribute of a respective knowledge vault entity comprises at least one of:
 an isA relationship between the respective knowledge vault entity and another knowledge vault entity.

12. A method according to claim 7, further comprising:
 receiving a query of the acquired data; and
 generating a response to the query based on the second metadata.

13. A non-transitory computer-readable medium storing program code, the program code executable by a processor of a computing system to cause the computing system to:
 store a knowledge vault comprising one or more knowledge vault models, wherein the knowledge vault models exist independently of any dataset;
 acquire data from a first data source;
 identify logical entities of a first data model of the first data source based on the data of the first data source, wherein the first data model defines a physical structure of datasets of the first data source, and the knowledge vault model of the knowledge vault provides dependencies and semantic information of the logical entities of the first data model;
 match, for one or more of the logical entities of the first data model, a respective knowledge vault entity described by first metadata, wherein the knowledge vault entity is a concept represented by the knowledge vault model, and wherein the matching includes matching at least one of: the name of the logical entity of the first data model to the name of the knowledge vault entity, functional dependencies between the logical entity of the first data model and the knowledge vault entity, hierarchies of the logical entity of the first data model and the knowledge vault entity, and measure dimensionality of the logical entity of the first data model and the knowledge vault entity;
 generate, in response to the matching, a plurality of semantic layer entities based on the matched knowledge vault entities and the one or more logical entities of the first data model, wherein generation of the semantic layer entities includes the generation of one or more dimensions as clusters of attributes, and each dimension is an element of an attribute along which an analysis may be performed;
 assign semantic information of the knowledge vault entities to their corresponding semantic layer entities, wherein semantic information describes at least one semantic attribute of the knowledge vault entity assigned to the corresponding semantic layer entity;
 store the semantic layer entity as second metadata describing the semantic layer entity comprising one or more dependencies and the assigned semantic information;
 receive a query of the acquired data; and
 generate a response to the query based on the second metadata.

14. A medium according to claim 13, the program code executable by a processor of a computing system to cause the computing system to:
 modify the second metadata to modify a definition of at least one of the plurality of semantic layer entities;
 modify the first metadata based on the modified second metadata;
 acquire data from a second data source;
 identify logical entities of a second data model of the second data source based on the data of the second data source;
 identify, for one or more of the logical entities of the second data model, a respective knowledge vault entity described by the modified first metadata; and
 generate third metadata describing a second plurality of semantic layer entities, the third metadata describing one of the second plurality of semantic layer entities comprising at least one semantic attribute of a knowledge vault entity described by the modified first metadata and corresponding to the one of the second plurality of semantic layer entities.

15. A medium according to claim 14, the program code executable by a processor of a computing system to cause the computing system to:
 receive an instruction to modify the first metadata based on the modified second metadata.

16. A medium according to claim 13, wherein the at least one semantic attribute of a respective knowledge vault entity comprises at least one of:
 a relationship between the respective knowledge vault entity and another knowledge vault entity;
 an attribute type; and
 an aggregation type.

17. A medium according to claim 13, wherein the at least one semantic attribute of a respective knowledge vault entity comprises at least one of:
 an isA relationship between the respective knowledge vault entity and another knowledge vault entity.

18. A system of claim 1, wherein each logical entity is at least one of a measure, dimension and detail of the data model; and
 wherein the knowledge vault entity includes a concept described by the first metadata.

19. A system of claim 1, wherein the generation of clusters of attributes is based on the detection of at least one of: keys with the data model, and key information stored within the knowledge vault.

* * * * *